United States Patent
Berge et al.

(10) Patent No.: US 6,646,070 B2
(45) Date of Patent: Nov. 11, 2003

(54) METALLIC FLAKE CONTAINING COATING COMPOSITIONS HAVING IMPROVED GLAMOUR

(75) Inventors: Charles T. Berge, Wilmington, DE (US); Michael Fryd, Philadelphia, PA (US); Josef Huybrechts, Oud-Turnhout (BE); Kenneth S. Kirshenbaum, West Bloomfield, MI (US); Karyn B. Visscher, Voorhees, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 218 days.

(21) Appl. No.: 09/828,748

(22) Filed: Apr. 9, 2001

(65) Prior Publication Data

US 2002/0198304 A1 Dec. 26, 2002

Related U.S. Application Data

(60) Provisional application No. 60/205,025, filed on May 18, 2000.

(51) Int. Cl.$^7$ .................................................. C08F 4/70
(52) U.S. Cl. ....................................... 526/115; 524/441
(58) Field of Search ................................. 524/441, 115

(56) References Cited

U.S. PATENT DOCUMENTS

| | | | |
|---|---|---|---|
| 4,479,718 A | | 10/1984 | Alman |
| 4,675,358 A | | 6/1987 | Frangou |
| 4,680,352 A | | 7/1987 | Janowicz et al. |
| 4,722,984 A | | 2/1988 | Janowicz |
| 4,835,018 A | | 5/1989 | Higginbotham et al. |
| 4,848,480 A | | 7/1989 | Titchener et al. |
| 5,104,922 A | * | 4/1992 | Chang ........................ 524/441 |
| 5,116,710 A | | 5/1992 | Kato |
| 5,378,291 A | | 1/1995 | Ara et al. |
| 5,854,321 A | | 12/1998 | Krause et al. |

FOREIGN PATENT DOCUMENTS

| | | |
|---|---|---|
| WO | WO 87/03605 | 6/1987 |
| WO | WO 96/06141 | 2/1996 |

OTHER PUBLICATIONS

European Search Report for EP01156089 A1, dated Apr. 27, 2001.

Grulke et al., Solubility Parameter Values, Polymer Handbook, (1989), VII/519.

* cited by examiner

Primary Examiner—David W. Wu
Assistant Examiner—William Cheung
(74) Attorney, Agent, or Firm—Sudhir G. Deshmukh

(57) ABSTRACT

This invention provides for an aqueous metallic flake containing coating composition having improved glamour. The coating composition includes a neutralized phosphated segmented copolymer dispersed in an aqueous carrier. The phosphorous moiety in the segmented copolymer passivates the metallic flakes, such as aluminum flakes, used to produce the glamour. As a result, generation of hydrogen gas is substantially reduced. The segmented copolymer is provided with hydrophobic and nonionic hydrophilic segments. Applicants have discovered that by including a nonionic hydrophilic segment in the segmented copolymer, glamour of the resultant coating composition can be improved. Furthermore, by controlling the molar ratio of the hydrophobic segment to the hydrophilic segment in the segmented copolymer and the solubility parameter of the hydrophobic segment, applicants have discovered that it is possible to use either a non-passivated aluminum flake or pre-passivated aluminum flake in the coating composition while improving glamour over conventional metallic paints and still maintaining the dispersion stability of the composition. As a result, formulator has substantial leeway in selecting from a wide array of environmentally acceptable solvents, film forming binders and components, which are typically added to a coating composition for improving the coating properties. The composition is most suited for use in automotive OEM and refinish metallic paints.

19 Claims, No Drawings

METALLIC FLAKE CONTAINING COATING COMPOSITIONS HAVING IMPROVED GLAMOUR

CROSS REFERENCE TO PROVISIONAL APPLICATION:

This application claims priority from U.S. Provisional Application Serial No. 60/205,025, filed on May 18, 2000.

TECHNICAL FIELD

This invention generally relates to a stable aqueous metallic flake containing coating composition that utilizes a phosphated polymer. In particular, this invention is directed to a stable aqueous aluminum flake containing a coating composition that utilizes a segmented phosphated copolymer.

BACKGROUND OF THE INVENTION

It is well known to use metallic flakes in coating compositions for imparting metallic glamour, particularly in exterior finishes applied on automobile and truck bodies. Though there are relatively few problems associated with the use of these metallic flakes in solvent based coating compositions, when utilized in waterborne coating compositions, the metallic flake, particularly aluminum flake, reacts with water and any acid constituents present in such coating compositions. As a result, the flake deteriorates and produces hydrogen gas, which is a potential safety hazard. Furthermore, finishes resulting from such coating compositions have a reduced brightness and glamour.

To avoid the foregoing problems, Frangou [U.S. Pat. No. 4,675,358 (1987)] and Antonelli et al. U.S. Pat. No. 5,104,922 (1992)] used phosphated linear random polymers in metallic flake containing coating compositions. The phosphated portion of the polymer provides passivation of the flake. Residual phosphorousic acid groups attached to the polymer are neutralized with an amine or an inorganic base to disperse the polymer into water. These polymers must be sufficiently hydrophobic to associate with the metallic flake, typically an aluminum flake whose surface is hydrophobic. However, it is very difficult to obtain a balance of properties with these polymers. If more passivation is needed for the flake, the phosphated hydrophobic portion of the polymer is increased but at the expense of the hydrophilic portion of the polymer which reduces the dispersibility of the polymer. On the other hand, if more dispersibility is needed, the phosphated hydrophobic portion of the polymer is reduced but the protection provided to the flake is reduced proportionately. As a result, the glamour in the long term is reduced. Thus, as these properties of passivation and dispersibility of the polymer have to be balanced against one another, it becomes very difficult to achieve an optimal balance and still produce acceptable glamour. Even though, aforedescribed phosphated polymers offer some improved protection to metallic flake pigments against the evolution of gases and exhibit some improvement in the stability of coating compositions formulated with metallic pigments, additional improvements in glamour for the resultant coatings are still desirable.

Thus, a polymeric dispersant is still needed for producing a stable aqueous metallic flake containing coating composition that protects the underlying substrate, suppresses the deterioration of the metallic flake and formation of gases, does not deteriorate on weathering, has compatibility with a variety of solvents used in aqueous coating compositions and still produces coatings having improved glamour over the aforedescribed prior art metallic flake containing coating compositions.

SUMMARY OF THE INVENTION

The present invention is directed to an aqueous metallic flake containing coating composition comprising:

metallic flakes and a neutralized phosphated segmented copolymer dispersed in an aqueous carrier, said neutralized segmented copolymer comprising a neutralized phosphated graft copolymer, neutralized phosphated block copolymer or a combination thereof, wherein said graft copolymer comprises one or more nonionic hydrophilic segments attached at single terminal points to a hydrophobic segment, and said block copolymer comprises one or two of nonionic hydrophilic segments linearly attached to a hydrophobic segment, wherein a molar ratio of said hydrophobic segment to said nonionic hydrophilic segment in said graft and block copolymers varies in the range of from 96:4 to 4:96 and wherein said nonionic hydrophilic segment is polymerized from one or more nonionic monomers selected from the group consisting of ethylene oxide, propylene oxide, butylene oxide, vinyl pyrolidone, oxazoline, hydroxyethyl (meth)acrylate and a combination thereof; and wherein said segmented phosphated copolymer is provided in the range of from 0.4 weight percent to 12 weight percent with phosphate moieties, all percentages being based on composition solids.

The present invention is also directed to a method for procucing aqueous metallic flake containing coating coposition comprising:

preparing a segmented copolymer comprising a graft copolymer, block copolymer or a combination thereof, wherein said graft copolymer is prepared by:

polymerizing one or more ethylenically unsaturated monomers, one or more phosphate moiety reactive monomers and one or more nonionic macromonomers terminated with a polymerizable double bond to produce said graft copolymer having a hydrophobic segment with one or more nonionic hydrophilic segments attached at single terminal points thereto, said hydrophobic segment having one or more phosphate reactive moieties positioned thereon, said nonionic macromonomer being selected from the group consisting of polyethylene glycol monomethacrylate methyl ether, polypropylene glycol monomethacrylate methyl ether, polybutylene glycol monomethacrylate methyl ether, polyvinyl pyrolidone, polyoxazoline, polyhydroxyethyl methacrylate and a combination thereof, and wherein a molar ratio of said hydrophobic segment to said nonionic hydrophilic segment in said graft copolymer varies in the range of from 96:4 to 4:96:

wherein said block copolymer is prepared by:

polymerizing one or more of nonionic monomers selected from the group consisting of ethylene oxide, propylene oxide, butylene oxide, vinyl pyrolidone, oxazoline and hydroxy ethyl (meth)acrylate, one or more phosphate moiety reactive monomers and one or more ethylenically unsaturated macromonomers to produce said block copolymer having a hydrophobic segment with one or two nonionic hydrophilic segments linearly attached thereto, said hydrophobic segment having one or more phosphate reactive moieties positioned thereon and wherein a molar ratio of said hydrophobic segment to said nonionic hydrophilic segment in said block copolymer varies in the range of from 96:4 to 4:96;

contacting orthophosphoric acid, phosphorus pentoxide, a phosphorus compound containing —O—PO(OH)$_2$ group, or a combination thereof with said segmented copolymer to provide said segmented copolymer with one or more said phosphate moieties thereon;

neutralizing said phosphate moieties on said segmented copolymer by contacting with a neutralizing agent to produce a neutralized phosphated segmented copolymer; and mixing metal flakes with said neutralized phosphated segmented copolymer in an aqueous carrier to produce said aqueous metallic flake containing coating composition.

One of the advantages of the coating composition of the present invention is that a coating resulting therefrom has improved glamour when compared against the glamour of coatings obtained from conventional waterborne metallic flake containing coating compositions.

Another advantage of the present invention is the flexibility it affords to the formulator in selecting from a wide variety of solvents, especially from the HAPs-free (hazardous air pollutants) solvents, in formulating the composition. As a result, the formulator, especially in the United States, is in a better position to meet the increasingly stringent legal requirements that deal with the acceptable level of release of VOC (volatile organic content) in the atmosphere.

Still another advantage of the present invention is the flexibility it affords to the formulator in selecting from a wide variety of metallic flakes, such as non-passivated or pre-passivated metallic flakes. As a result, the formulator has greater freedom in tailoring the resulting coating composition having desired coating properties, such as, for example, etch and mar resistance.

Yet another advantage of the novel aqueous metallic coating composition of the present invention is its improved dispersibility under a variety of loading requirements, such as higher metallic flake loading.

The novel aqueous metallic coating composition of the present invention also advantageously permits the formulator to select from a wider selection of other film forming polymers that can be incorporated in the coating composition.

DETAILED DESCRIPTION OF THE INVENTION

As defined herein:

"Glamour" relates to the reflectance of a metallic flake containing coating when viewed from different angles, i.e., directional reflectance. One aspect of glamour is the reflectance of the coating when measured at the Near-Specular angle. The reflectance at this angle is called the Head-On-Brightness. Another aspect of glamour is how the reflectance changes between the Near-Specular and Far-From-Specular angles. This change in the reflectance is known as "flop", "flip-flop", "flash", "side-tone" or "travel". Thus, glamour is reported in a number of ways, all relating to the spectrophotometric measurements of a metallic coating taken at various angles of reflectance. The process and the measurement device utilized for determining glamour are described in the U.S. Pat. No. 4,479,718, which is incorporated herein by reference. The higher the reported reading, the better is the glamour of the coating."

"Dispersibility" relates to the robustness of the stability of metal flakes to stay dispersed, i.e., not gel, in an aqueous carrier of a coating composition under various application conditions and also in the presence of various additives typically added to the coating composition for attaining desired coating properties. "Metallic coating" or "coating" means a cured film of desired thickness on a substrate surface obtained from the application of a layer, typically through a spray nozzle, of an aqueous metallic coating composition.

"(Meth)acrylic" means methacrylic and acrylic.

"Polymer solids" or "composition solids" means a polymer or composition in its dry state.

"GPC weight average (Mw) or GPC number average (Mn) molecular weight" means Mw and Mn molecular weights of polymers obtained by using gel permeation chromatography utilizing polystyrene as the standard and tetrahydrofuran as the carrier solvent.

"Graft copolymer" means a segmented copolymer having one or more polymeric segments attached to each other, such as hydrophobic A and hydrophilic B segments illustrated in the following figures, wherein segment B results from a macromonomer having a single polymerizable double bond:

"Block copolymer" means a segmented copolymer having one or more

polymeric segments substantially linearly attached to each other, such as hydrophobic A and hydrophilic B segments illustrated in the following figures:

"Passivated metallic flake" means a metallic flake that has been treated or

coated to reduce the chemical reactivity of its surface. The term "pre-passivated metal flakes" means metal flakes that had been passivated before they are added to a coating composition. The term "non-passivated metal flakes" means metal flakes that had not been subjected to passivation before addition to a coating composition.

"Water miscible solvents" are those solvents that are completely or substantially soluble in water.

"Water reducible solvents" are those solvents that require co-solvent(s) for dissolving them in water.

"Solubility parameter" relates to a degree to which a hydrophobic segment in a copolymer partially dissolves in water. Thus, hydrophobic monomers having solubility parameters lower than those monomers having relatively higher solubility parameters would produce a hydrophobic segment that is relatively less soluble. Applicants have discovered that by making the use of the solubility parameter of the hydrophobic segment in a segmented copolymer, formulator can choose from a wider selection of metallic flakes that can be incorporated in a metallic paint. Thus, by lowering the solubility parameter of a hydrophobic segment, which is accomplished by selecting a mix of monomers having lower solubility parameters, the hydrophobicity of the resulting hydrophobic segment can be lowered. As a result, the formulator can achieve an optimal balance of the hydrophobic/hydrophylic segments suitable for use with non-passivated, pre-passivated metallic flakes or a combination thereof, as metallic flakes in the coating composition. Solubility parameters of monomers and polymers are known and can be obtained from several sources, such as, for example, from *Solubility Parameter Values* by E. Grulke in the *Polymer Handbook*, $3^{rd}$ Edition (1989), edited by J. Brandrup and E. H. Immergut (publisher—John Wiley & Sons, New York, N.Y.) or from *Handbook of Polymer-Liquid Interaction Parameters and Solubility Parameters* by Allan F. M. Barton, 1990 edition (publisher—CRC Press, Boca Raton, Fla.).

The novel aqueous metallic coating composition of the present invention includes a neutralized segmented copolymer and metallic flakes. The applicants have unexpectedly discovered that the novel neutralized segmented copolymer of the present invention not only provides a stable waterborne coating composition but it also improves the glamour of the resultant coating when compared to conventional metallic coating. Moreover, the neutralized segmented copolymer of the present invention is compatible with a wide variety of film forming polymer binders, especially acrylic polymers, widely used in waterborne coatings.

The GPC weight average molecular weight of the neutralized segmented copolymer varies in the range of from 2,000 to 100,000, preferably in the range of from 10,000 to 40,000, more preferably in the range of from 5,000 to 30,000.

The neutralized phosphated segmented copolymer includes a neutralized phosphated graft copolymer, neutralized phosphated block copolymer or a combination thereof. When used as a combination, the neutralized phosphated segmented copolymer includes in the range of from 1 weight percent to 99 weight percent and more preferably in the range of from 70 weight percent to 90 weight percent of the graft copolymer, the remainder being the block copolymer, all weight percentages being based on the weight of copolymer solids. The neutralized phosphated graft copolymer is preferred.

The neutralized graft copolymer includes one or more nonionic hydrophilic segments attached at single terminal points to a hydrophobic segment and the neutralized block copolymer includes one or two nonionic hydrophilic segments linearly attached to one or at both terminal ends of a hydrophobic segment. The "hydrophobic" (repelling, tending not to combine with, or incapable of dissolving in water) segment is relatively more hydrophobic than the "hydrophilic" (having an affinity for water, readily absorbing or dissolving in water) nonionic segment. It is believed that the novel hydrophobic/hydrophilic segments of the segmented copolymer of the present invention provide maximum passivation of the flake, while still adequately dispersing the flakes and forming a stable aqueous coating composition.

The molar ratio of the hydrophobic segments to hydrophilic nonionic segments in both block and graft copolymers varies in the range of from 96:4 to 4:96, preferably in the range of from 85:15 to 15:85, more preferably in the range of from 80:20 to 20:80 and most preferably at 22:78.

The nonionic hydrophilic segment of the graft copolymer may be a nonionic macromonomer terminated with a polymerizable double bond to which the hydrophobic segment can be attached. Some of the suitable nonionic macromonomers terminated with a polymerizable double bond include polyethylene oxide, polypropylene oxide, polybutylene oxide, polyvinyl pyrolidone, polyoxazoline, polyhydroxy-ethyl methacrylate or a combination thereof. Polyhydroxyethyl methacrylate may be a homopolymer or a copolymer polymerized from a hydroxyethyl methacrylate monomer and one or more methacrylic monomers. The molecular weight of the nonionic macromonomer varies in the range of from 250 to 10,000, preferably from 500 to 3000 and more preferably from 550 to 2000. Suitable nonionic macromonomers terminated with a polymerizable double bond are commercially available. For example, Bisomer S 20W polyethylene glycol monomethacrylate methyl ether is available from Laporte Performance Chemicals. The nonionic hydrophilic segment of the block copolymer results from polymerizing one or more nonionic monomers selected from the group consisting of ethylene oxide, propylene oxide, butylene oxide, vinyl pyrolidone, oxazoline, hydroxyethyl (meth)acrylate and a combination thereof. Ethylene oxide is preferred. The nonionic hydrophilic segment results from a polymer having a GPC weight average molecular weight in the range of from 250 to 10,000, preferably from 500 to 3000 and more preferably from 550 to 2000.

Some of the monomers suitable for polymerizing the hydrophobic segment include alkyl (meth)acrylates having 1-18 carbon atoms in the alkyl group, such as methyl (meth)acrylate, ethyl (meth)acrylate, propyl (meth)acrylate, isopropyl (meth)acrylate, butyl (meth)acrylate, pentyl (meth)acrylate, hexyl (meth)acrylate, 2-ethyl hexyl (meth)acrylate, nonyl (meth)acrylate, lauryl (meth)acrylate, stearyl (meth)acrylate; cycloaliphatic (meth)acrylates, such as trimethylcyclohexyl (meth)acrylate, and isobutylcyclohexyl (meth)acrylate; aryl (meth)crylates, such as benzyl (meth)acrylate. Other polymerizable monomers that can be used are isobornyl (meth)acrylate, styrene, alpha methyl styrene, methacrylamide and methacrylonitrile. Various combinations of the foregoing monomers are also suitable.

The segmented copolymer is further provided with phosphorous moieties in the range of from 0.4 weight percent to 12 weight percent, preferably in the range of from 0.8 weight percent to 9.0 weight percent and more preferably in the range of from 1.2 weight percent to 6.0 weight percent, all percentages being based on composition solids. The phosphorous moieties can be provided on either the hydrophobic or hydrophilic segments, or on both. Phosphorous moieties positioned on the hydrophobic segment are preferred. The phosphorous moiety passivates the metallic flakes, thereby substantially reducing the formation of gas, such as hydrogen, produced when aluminum flakes are used in aqueous coating compositions. Some of the suitable phosphorous moieties include those having at least one reactive oxygen, such as the one in a hydroxyl group. Phosphate moiety is preferred.

The metallic flakes and the neutralized segmented copolymer of the coating composition are dispersed in an aqueous carrier. The aqueous carrier includes water and generally includes one or more solvents, which may be water soluble, water reducible solvents or a combination thereof. The amount of solvent added to the coating composition is adjusted to provide the composition with a VOC (volatile organic content) in the range the range of from 0.1 kilograms (1.0 pounds per gallon) to 0.5 kilograms (4.0 pounds per gallon), preferably 0.3 kilograms (2.6 pounds per gallon) to 0.43 kilograms (3.6 pounds per gallon) and more preferably 0.34 kilograms (2.8 pounds per gallon) to 0.4 kilograms (3.4 pounds per gallon) of the solvent per liter of the coating composition. Some of the suitable solvents include $C_1$ to $C_{12}$ mono and di-alcohols, such as, for example, isopropanol, ethanol, methanol, butanol, 2-ethylhexanol and dodecanol. Tetrahydrofuran, glycol ethers and glycol ether acetates are also suitable. Other solvents include toluene, hexane, butyl cellosolve, butyl cellosolve acetate, carbitol. Some of the solvents, for example, propylene glycol monomethyl ether, ethylene glycol hexyl acetate, ethylene glycol n-butyl ether, dipropylene glycol and methyl ether acetate are available from Dow Chemical Company, Midland, Mich. Isopropanol, methyl ethyl ketone and acetone are preferred. If required and in order to reduce the HAPs, HAPs-free solvents, such as ethanol, butanol, butyl acetate, isobutanol, acetone, diacetone alcohol, methyl amyl alcohol, cyclohexanone, primary amyl acetate, methyl amyl ketone, 2-ethyl hexanol, propanol, ethyl acetate, tetrahydrofuran, isopropyl acetate, 2-ethyl hexyl acetate, ethyl 3-ethoxy propionate, pentyl propionate, ethanol, n-butyl propionate, tertiary butyl alcohol and 1-pentanol are most suitable.

Typically the aqueous carrier includes suitable amounts of minor components including non-alcohols, such as mineral spirits of various boiling point ranges. If desired suitable amounts of aromatic solvents such as, toluene, xylene and Solvesol 100, and nitro paraffins, such as 1-nitropropane and 2-nitropropane, can be added in small amounts.

The segmented copolymer having phosphorous moieties in the aqueous carrier is then neutralized with one or more neutralizing agents for aiding dispersion. Some of the suitable neutralizing agents include an inorganic base, an amine or a combination thereof. Suitable inorganic bases include alkali metal halide, preferably sodium hydroxide, and ammonium hydroxide. Ammonium hydroxide is preferred as an inorganic base. Suitable amines include amino methyl propanol, amino ethyl propanol, dimethyl ethanol amine and triethylamine. Amino methyl propanol and dimethyl ethanol amine are preferred.

Typically, the amount of metallic flakes added to the coating composition depends upon the degree of glamour desired. Generally, the coating composition includes in the range of from 0.1 weight percent to 40 weight percent, preferably in the range of from 1.0 weight percent to 20 weight percent of metallic flakes, all percentages being based on total composition solids. Some of the suitable metallic flakes include aluminum, bronze, nickel, and stainless steel. Metallic flakes, suitable for use in the present invention may pre-passivated or non-passivated. Aluminum flakes are preferred. Aluminum flakes suitable for use in the present invention include SS, SSP, TF, SIII grades supplied by Silberline Manufacturing Company, Brecksville, Ohio; TRC, WJD grades supplied by Toyal Americal, Inc., Lockport, Ill.; and Hydrolac® aluminum flakes supplied by Eckert America, Louisville, Ky. If desired, the coating composition can include pearlescent flakes and coated mica flakes, such as mica flakes coated with finely divided titanium dioxide.

Applicants have unexpectedly discovered that by controlling the molar ratio of the hydrophobic segment to the nonionic hydrophilic segment in the segmented copolymer, the formulator is afforded the freedom to utilize various types of metallic flakes without destroying the dispersibility of the resulting coating composition or generating unacceptable levels of hydrogen that typically result when non-passivated aluminum flakes are dispersed in aqueous coating compositions. As a result, the formulator is provided more flexibility in fine tuning the blending of the aqueous carrier that meets the customer requirements.

Thus, by including a neutralized segmented copolymer in the coating composition to assist in the flake dispersion, an optimum coating composition can be formed to provide maximum passivation of the flake, adequately disperse the flake and still form a stable aqueous coating composition.

In addition to the metallic flake, the coating composition of the present invention may include any of the conventional pigments typically used in waterborne paints, such as metallic oxides, including titanium dioxide, iron oxides of various colors, zinc oxide, carbon black; filler pigments such as, talc, china clay, barytes, carbonates, silicates; and a wide variety of organic pigments such as, quinacridones, phthalocyanines, perylenes, azo pigments, indanthrones, carbazoles such as, carbazole violet, isoindolinones, isoindolones, thioindigo reds, and benzimidazolinones. It may be desirable to add other optional ingredients to the coating composition, such as antioxidants; flow control agents; rheology control agents, such as fumed silica and non-aqueous dispersions (NADs); UV stabilizers; UV screeners, quenchers and absorbers.

Under some circumstances, it may be desirable to form coating compositions that do not contain metallic flakes but contain any of the aforementioned non-metallic flakes. Though such non-metallic flakes do not require passivation, it is still expected and contemplated that the neutralized phosphated segmented copolymer of the present invention would provide excellent dispersibility to such a coating composition containing non-metallic flakes.

As stated earlier, the segmented copolymer may be a graft copolymer, block copolymer or a combination thereof. The processes described below can be employed to produce the graft copolymer and the block polymer.

The nonionic macromonomers, such as polyethylene, polypropylene, polybuylene glycol monomethacrylate methyl ethers are available commercially, for example, International Specialty Chemicals, United Kingdom and Laporte Performance Chemicals.

The following method describes one way to make nonionic macromonomers containing hydroxyethyl methacrylate:

In the preparation of the nonionic macromonomer to ensure that the resulting macromonomer has only one terminal double bond which will polymerize with the hydrophobic monomers to form the graft copolymer, the macromonomer is polymerized by using a catalytic cobalt chain transfer agent that preferably contains a $Co^{+2}$ or $Co^{+3}$ group. Typically, in the first step of the process for preparing the macromonomer, the aforedescribed nonionic monomers are mixed with an inert organic solvent and a cobalt chain transfer agent and heated usually to the reflux temperature of the reaction mixture. In subsequent steps additional monomers and cobalt catalyst and conventional azo polymerization catalyst such as, 2,2'-azobis(2-methylbutanenitrile) and 2,2'-azobis(2,4'-dimethylpentanenitrile) 2,2'-azobis(2,4-dimethyl-4-methoxyvaleronitrile) are added and polymerization is continued at about 100° C. to 135° C. for about 4 to 8 hours until a macromonomer of a desired molecular weight is formed. Preferably, the inert organic solvent is then stripped off. Preferred cobalt chain transfer agents or catalysts are described in U.S. Pat. No. 4,680,352 to Janowicz et al and U.S. Pat. No. 4,722,984 to Janowicz and WO 87/03605, hereby incorporated by reference in their entirety. Most preferred are pentacyanocobaltate (II or III), diaquabis (borondifluorodimethyl-glyoximato) cobaltate(II or III) and diaquabis(borondifluorophenylglyoximato) cobaltate (II or III). Typically these chain transfer agents are used at concentrations of about 5 to 1000 ppm (parts per million) based on the monomers used.

One of the ways, the graft copolymer suitable for use in the present invention is prepared is by polymerizing one or more of the aforedescribed ethylenically unsaturated monomers and one or more phosphorous moiety reactive monomers in an inert organic solvent and in the presence of the aforedescribed nonionic macromonomers and a polymerization catalyst, such as any of the aforementioned azo catalyst or other suitable catalysts such as, peroxides and hydroperoxides. Typical of such catalyst are di-tertiary butyl peroxide, di-cumylperoxide, tertiaryamyl peroxide, cumenehydroperoxide, di(n-propyl) peroxydicarbonate, peresters such as, amyl peroxyacetate and t-butyl peracetate. Some of the phosphorous moiety reactive monomers suitable for use in the present invention include glycidyl (meth) acrylate. Glycidyl methacrylate is preferred. The amount of phosphorous moiety reactive monomer added to the reaction mixture is adjusted to provide the graft copolymer with the desired level of phosphorous moieties and the amount of ethylenically unsaturated monomers and macromonomers added to the reaction mixture is adjusted to achieve the desired molar ratio of the hydrophobic segment to the nonionic hydrophilic segment. Polymerization is continued at about 100° C. to 135° C. for about 4 to 8 hours, usually at the reflux temperature of the reaction mixture, until a graft copolymer is formed having the desired molecular weight.

The graft copolymer having the phosphate reactive moieties, such as glycidyl moieties, is then reacted preferably with a 1:1 molar equivalent amount of orthophosphoric acid ($H_3PO_4$), phosphoric acid, phosphorus pentoxide $P_2O_5$ or other phosphorus compounds which contain the grouping —O—PO(OH)$_2$, such as, for example pyrophosphoric acid ($H_4PO_7$) to provide the graft polymer with phosphate moieties. The reaction is continued at about 50° C. to 70° C. for 4 to 6 hours or until all the glycidyl moieties are reacted. The extent of reaction can be determined by making acid number measurements.

The phosphated graft copolymer is then neutralized with the aforedescribed neutralizing agent and mixed with a desired amount of the metallic flake. Conventional mixing is used to form the dispersion. Often an associate thickener is added to aid in formation of a stable dispersion.

Another way to introduce phosphate groups into the graft copolymer is to form a polymer having reactive hydroxyl group, such as for example, by forming the graft copolymer with hydroxy alkyl methacrylates or acrylates and subsequently reacting the hydroxy groups with phosphorus pentoxide and neutralizing phosphoric acid groups with amine or inorganic)ase described earlier.

Then, one of the processes that can be used for producing the block copolymer is as follows:

As a first step, ethylenically unsaturated macromonomers having a GPC weight average molecular weight in the range of from 250 to 10,000, preferably from 500 to 3000 and more preferably from 550 to 2000 are produced.

One or more of nonionic monomers selected from the group consisting of ethylene oxide, propylene oxide, butylene oxide, vinyl pyrolidone, oxazoline and hydroxy ethyl (meth)acrylate, one or more of the phosphorous moiety reactive monomers are preferably added to an inert organic solvent and then one or more of the ethylenically unsaturated macromonomers are added to the polymer mixture to produce the block copolymer having a hydrophobic segment with one or two nonionic hydrophilic segments linearly attached thereto. The hydrophobic segment has one or more phosphorous reactive moieties positioned thereon and the molar ratio of the hydrophobic segment to the nonionic hydrophilic segment in the block copolymer varies in the range of from 96:4 to 4:96, preferably in the range of from 85:15 to 15:85, more preferably in the range of from 75:25 to 25:75 and most preferably at 22:78.

A number of parameters can be adjusted with the segmented copolymer to form an optimum dispersant. The molar ratio of the hydrophobic segment to the nonionic hydrophilic segment can be adjusted, the GPC weight average molecular weight of the hydrophobic segment can be increased or decreased, the number phosphorous moieties of the segmented copolymer disposed on either the hydrophilic segment or the hydrophobic segment can be adjusted as needed to provide optimum passivation and dispersibility. By using the segmented copolymer, a substantially wider range of copolymers can be formulated that balance, hydrophilicity and hydrophobicity and phosphate content of the graft copolymer to form superior dispersions and coating compositions by comparison to the conventional coating compositions.

Particularly useful aqueous metallic flake containing coating composition suitable for using pre-passivated aluminum flakes includes a graft copolymer having a hydrophobic segment of polymerized monomers of styrene/methyl methacrylate/butyl acrylate/glycidyl methacrylate in weight ratios of 20/25/35/20, 30/20/30/20 and 20/25/35/20 and having a weight average molecular weight in the rang of 14,000 to 18,000. The nonionic hydrophilic segment of the graft copolymer results from polyethylene glycol monomethacrylate methyl ether. The glycidyl groups of the copolymer are reacted with phosphorousic acid on a 1/1 molar equivalent basis.

Applicants have unexpectedly discovered that by controlling the molar ratio and the hydrophobicity of the hydrophobic segment, expressed as solubility parameter, the formulator can select from a wide range of the metallic flakes. Thus, when a segmented copolymer having the molar ratio above 65:35 and the solubility parameter below 8.9 is used, the coating composition can include pre-passivated, non-passivated aluminum flakes or a combination thereof. The preferred solubility parameter herein is in the range of 7.8 to 8.6, more preferably in the range from 8.4 to 8.6.

When a segmented copolymer having the molar ratio below 65:35 and the solubility parameter above 8.9 is used, the coating composition can include pre-passivated flakes, more particularly pre-passivated aluminum flakes. The preferred solubility parameter herein is in the range of 9.3 to 11, more preferably in the range from 9.3 to 9.4. Even though the formulator has fewer options with respect to the type of metallic flakes that can be used, by using relatively less hydrophobic segment, the dispersibility of the coating composition can be improved. As a result, the formulator has more choices of additives that can be added to the coating compositions.

The coating composition of the present invention can be used in a variety of ways, such as topcoats which may be monocoats or basecoats of a clearcoat/basecoat finish and may also be added to primers and primer surfacers. These compositions preferably have an acrylic polymer as the film forming constituent and may contain crosslinking agents, such as blocked isocyanate, alkylated melamines, and epoxy resins. Other suitable film forming polymers include acrylourethanes, polyesters and polyester urethanes, polyethers and compatible polyether urethanes. It is desirable to have the film-forming polymer of the coating composition substantially structurally similar to the neutralized phosphated segmented copolymer so that during curing, the film-forming polymer will cure at a substantially the same rate as the segmented copolymer thereby preventing striation of the resultant coating.

The metallic flake containing coating composition of the present invention is most suitable for use as an automotive paint in OEM (original equipment manufacturer) automotive settings or as an automotive refinish paint typically used in making repairs and touch-ups to automotive bodies. Obviously, the paint is also well suited for use in other applications such as coating truck bodies, boats, airplanes, tractors, cranes and other metal bodies. If desired, the coating composition of the present invention can be also used on non-metallic surfaces, such as wood and plastic, for example RIM (reaction injection molded) auto bumpers.

The following examples illustrate the invention.

EXAMPLES

Phosphated Neutralized Segmented Copolymer 1 (graft copolymer)

| | | |
|---|---|---|
| Part 1 | Reactor equipped with stirrer, thermocouple and condenser and maintained under a nitrogen atmosphere was charged with the component shown below (all amounts in grams). The reaction mixture was heated to reflux. | |
| | 2-ethylhexyl methacrylate | 19.58 |
| | glycidyl methacrylate | 4.75 |
| | methyl ethyl ketone | 18.04 |
| | di-ionized water | 10.86 |
| | isopropyl alcohol | 117.28 |
| | Nonionic hydrophilic macromonomer 1 | 10.86 |
| | (Bisomer 550 polyethyleneglycol monomethacrylate @ Mn of 550 supplied by LaPorte Chemicals) | |
| Part 2 | Thereafter the following monomers and initiator were added to the charge in the reactor over a reactor period of 120 minutes. | |
| | 2-ethylhexyl methacrylate | 158.45 |
| | glycidyl methacrylate | 38.44 |
| | VAZO ® 52 Initiator supplied by DuPont Company, Wilmington, Delaware | 5.48 |
| Part 3 | The following components were premixed and added to the reactor concurrently with the feed from Part 2 above | |
| | Nonionic hydrophilic macromonomer 1 | 87.88 |
| | di-ionized water | 87.88 |
| Part 4 | The components below were mixed and fed to the reactor over a period of 15 minutes after the completion of the reaction period stated above. The reaction mixture was held for 60 minutes. | |
| | VAZO ® 52 Initiator | 8.90 |
| | methyl ethyl ketone | 9.02 |
| | isopropyl alcohol | 22.55 |
| Part 5 | The reaction mixture was cooled to 50° C. and a single shot of phosphorousic acid described below was added. The reaction mixture was held for 60 minutes. Thus, Segmented Copolymer 1 resulted from 70 parts by weight of hydrophobic segment [EHMA/GMA(80/20)] and 30 parts by weight of hydrophilic segment (hydrophilic macromonomer 1) having actual solids of 57.39% (theoretical solids @ 57.4%) and solubility parameter of 8.6. | |
| | phosphorousic acid (85%) | 36.64 |

Phosphated Neutralized Segmented Copolymer 2 (graft copolymer)

| | | |
|---|---|---|
| I. | Reactor equipped with stirrer, thermocouple and condenser and maintained under a nitrogen atmosphere was charged with the component shown below (all amounts in grams). The reaction mixture was heated to reflux. | |
| | n-butyl acrylate | 457.97 |
| | glycidyl methacrylate | 72.73 |
| | isopropyl alcohol | 808.06 |
| | Nonionic hydrophilic macromonomer 2 | 117.37 |
| | (Bisomer S20W methoxypolyethyleneglycol methacrylate sol supplied by LaPorte Performance Chemicals) | |
| II. | Thereafter the following components were added to the charge in the reactor over a reaction period of 180 minutes. | |
| | n-butyl acrylate | 3705.37 |
| | glycidyl methacrylate | 565.64 |
| | Nonionic hydrophilic macromonomer 2 | 117.37 |
| III. | The following components were mixed and added concurrently with the charge in II over the same reaction period. | |
| | VAZO ® 52 Initiator | 126.26 |
| | methyl ethyl ketone | 404.03 |
| | isopropyl alcohol | 1010.08 |
| IV. | The components below were mixed and fed to the reactor over a period of 15 minutes after the completion of the reaction period stated above. The reaction mixture was held for 120 minutes. | |
| | VAZO ® 52 Initiator | 75.76 |
| | methyl ethyl ketone | 202.02 |
| | isopropyl alcohol | 505.05 |
| V. | The reaction mixture was cooled to yield the phosphated neutralized Segmented Copolymer 2 (Theor. Solids = 61.52%), which resulted from 90 parts by weight of hydrophobic segment [NBA/GMA (87/13)] and 10 parts by weight of hydrophilic segment (hydrophilic macromonomer 2). Segmented Copolymer 2 had a solubility parameter of 9.4. | |

Phosphated Neutralized Segmented Copolymer 3 (block copolymer)

| | | |
|---|---|---|
| Part 1: | Reactor is equipped with stirrer, thermocouple and condenser and maintained under a dry nitrogen atmosphere. The assembled reactor is dried with a heat gun while purging with nitrogen. The reactor is charged with the components shown below (all amounts shown in grams). Heat to reflux and remove tetrahydrofuran used for the dehydration step. | |
| | tetrahydrofuran (solvent) | 688.95 |
| | (supplied by Aldrich Chemicals) | |
| | tetrahydrofuran (for dehydration step) | 31.80 |
| | bis(dimethylamino)methyl silane (water scavenger) | 0.61 |
| | (supplied by United Chemical Technologies, Inc.) | |
| Part 2: | Add the following initiator as a shot to the reactor: | |
| | 1-trimethylsiloxy-1-methoxy-2-methylpropene (initiator) (supplied by CK Witco) | 39.96 |
| Part 3: | Add the following as a shot after the monomer feed (Part 4) has been set up (but not added yet) | |
| | Tetrabutylammonium chlorobenzoate solution (catalyst) (supplied by DuPont Company) | 0.73 |
| Part 4: | Premix the following monomers, add over 20 minutes and let the temperature rise and peak, then proceed to Part 5 | |
| | 2-ethylhexyl methacrylate (monomer) | 364.33 |
| | (supplied by Aldrich Chemicals) | |
| | glycidyl methacrylate (monomer) | 65.29 |
| | (supplied by Aldrich Chemicals) | |
| Part 5: | Premix the following monomer, add over 20 minutes; let the temperature rise and peak; wait 20 minutes and then proceed to Part 6 | |
| | 2-(trimethylsiloxy)ethyl methacrylate (monomer) | 464.65 |
| | (supplied by Aldrich Chemicals) | |
| Part 6: | Premix the following and add over 30 minutes with high agitation. Mix for 15 minutes at low agitation. This will quench and terminate the reaction, and deprotect the hydroxyethyl methacrylate block. | |
| | De-ionized water (quench and diluent) | 41.34 |
| | Dodecylbenzenesulfonic acid (catalyst) | 0.77 |
| | (supplied by Aldrich Chemicals) | |
| Part 7: | Equip the setup for vacuum distillation. Add isopropanol solvent and distill off trimethylsilanol | |

-continued

| | | |
|---|---|---|
| waste and tetrahydrofuran waste. Keep the batch temperature below 150 C. | | |
| Isopropanol (solvent) | | 229.00 |
| Trimethylsilanol waste (solvent) | | 206.68 |
| Tetrahydrofuran waste (solvent) | | 720.75 |
| Part 8: | Phosphate the reaction mixture using the previously stated procedures to yield the phosphated neutralized segmented copolymer 3, which resulted from 60 parts by weight of hydrophobic segment [EHMA/GMA (85/15)] and 40 parts by weight of hydrophilic segment (HEMA (100)). | |

Metallic Paints of Example 1 and Comparative Example 1

| | Ingredient | Example 1 | Comp. Example. 1 | Supplier |
|---|---|---|---|---|
| Step 1 | The following ingredients were added, under moderate stirring, in the following order to produce Example 1 of the coating composition of the present invention and a Comparative Example 1 (Comp. Example. 1). All amounts are in grams. | | | |
| | Solvent (Propylene glycol monobutyl ether) | 66.40 | 66.40 | BP Amoco Warrensville Heights, Ohio |
| | Solvent (Exxate ® 900 nonyl acetate) | 16.60 | 16.60 | Exxon Chemicals, Houston, Texas |
| | Non-passivated aluminum flake paste 93-0595 | 71.20 | 71.20 | Alcan Toyal, Lockport, Illinois |
| Step 2 | Ingredients in Step 1 were stirred vigorously for 10 minutes and then the following ingredients were added. | | | |
| | Segmented Copolymer 1 (57.4% solids) | 18.00 | — | |
| | Comparative Copolymer 1 (44.3% solids) | — | 23.30 | Based on the U.S. Pat. No. 5,502,113* |
| Step 3 | Ingredients in Step 2 were stirred moderately for 20 minutes and then the following ingredients were added. | | | |
| | Neutralizing agent (amino methyl propanol @ 95% strength) | 2.12 | 2.12 | Aldrich Chemical Company, Milwaukee, Wisconsin |
| Step 4 | Ingredients in Step 3 were stirred for 10 minutes and then the following ingredients were added under enough stirring speed to maintain a 2.54 cm vortex. | | | |
| | Film forming acrylic polymer | 225.34 | 221.47 | Based on examples in the U.S. Pat. Nos. 4,322,284 & 4,403,003 & 4,539,363 |
| Step 5 | Ingredients in Step 4 were stirred for 20 minutes at moderate speed and then the following ingredients were added. | | | |
| | Cymel ® 301 melamine cross linking agent | 159.00 | 159.00 | Cytec Industries, Morristown, NJ |
| | Setalux ® EPL-6870 film forming polymer | 643.00 | 643.00 | Akzo-Nobel, Louisville, Kentucky |
| | Solvent (dipropylene glycol methyl ether) | 60.00 | 60.00 | Dow Chemicals, Midland, Michigan |
| | Solvent (2-ethyl hexanol) | 25.00 | 25.00 | Eastman Chemical Co., Kingsport, Tennesse |
| | Neutralizing agent (amino methyl propanol @ 95% strength) | 1.17 | 3.37 | Aldrich Chemical Company, Milwaukee, Wisconsin |
| | Nacure ® XP-221 catalyst with water (29.71) | 14.00 | 14.00 | King Industries, Norwalk, Connecticut |
| Step 6 | Ingredients in Step 5 were stirred for 20 minutes and then the following ingredient was added and the resulting composition was stirred for 20 minutes. | | | |
| | Water | 549.13 | 541.81 | |

*The monomer mix for the Comparative Example 1 included Styrene/Methyl methacrylate/butyl acrylate/glycidyl methacrylate/hydroxy ethyl acrylate at weight ratios of 40/5/15/20/30. Example 1 from U.S. Pat. No. 5,502,113 was utilized except methyl amyl ketone at column 8, line 6 was replaced with butyl cellosolve, and isopropanol at column 8, line 38 was replaced with 2-Nitropropane.

The following glamour results were obtained by analyzing air dried 76 micrometers (3 mil) layers applied with a draw down bar on a glass surface of the foregoing coating compositions by using a Macbeth Analytical Computer/Analyzer

| | | |
|---|---|---|
| Near specular L (HOB) | 152.70 | 144.50 |
| Flop/Travel | 25.85 | 14.62 |

The following glamour results were obtained by analyzing 15.2 micrometers to 20.3 micrometers (0.6 to 0.8 mil) cured film thickness coatings on a metal substrate of the foregoing coating compositions. Spray applied layers were pre-baked for 5 minutes at 82° C. (180° F.) followed by bake curing for 30 minutes at 129° C. (265° F.). Macbeth Analytical Computer/Analyzer MAC-04, Serial 13 supplied by DuPont Company, Wilmington, Del. was used.

| | | |
|---|---|---|
| Near specular L (HOB) | 121.70 | 94.90 |
| Flop/travel | 9.30 | 6.22 |

From the foregoing results, it can be readily seen that the metallic coating composition of the present invention provides improved glamour over conventional coating composition, even with non-passivated aluminum flakes.

Metallic Paints of Example 2 and Comparative Example 2

| | Ingredient | Example 2 | Comp. Example 2 | Supplier |
|---|---|---|---|---|
| Step 1 | The following ingredients, under moderate stirring, were added in the following order to produce Example 2 of the present invention and a Comparative Example 2. All quantities are in grams: | | | |
| | Solvent (ethylene glycol monobutyl ether) | 66.40 | 66.40 | Union Carbide |
| | Isopar ™ H solvent | 16.60 | 16.60 | Exxon Chemicals, Houston, Texas |

-continued

| | Ingredient | Example 2 | Comp. Example 2 | Supplier |
|---|---|---|---|---|
| | Segmented Copolymer 2 (61.7% solids) | 10.50 | 0.00 | |
| Step 2 | Ingredients in Step 1 were stirred for 10 minutes, under faster stirring, then the following ingredients were added: | | | |
| | Hydrolac ®WHH 60 nL Pre-passivated aluminum flakes | 76.70 | 76.70 | Eckart Aluminum |
| Step 3 | Ingredients in Step 2 were stirred for 20 minutes, under moderate stirring, then the following ingredients were added: | | | |
| | Neutralizing agent (amino methyl propanol (95%)) | 1.10 | 0.60 | Aldrich Chemical Company, Milwaukee, Wisconsin |
| Step 4 | Ingredients in Step 3 were stirred for 10 minutes and then the following ingredients were added under enough stirring speed to maintain a 2.54 cm vortex. | | | |
| | Film forming acrylic polymer | 228.70 | 239.20 | Based on examples in the U.S. Pat. Nos. 4,322,328; 4,403,003; 4,539,363 |
| | DI water | 35.00 | 35.00 | |
| Step 5 | Ingredients in Step 4 were stirred at moderate speed for 20 minutes and the following ingredients were added: | | | |
| | Cymel ® 301 melamine Cross-linking agent | 159.00 | 159.00 | Cytec Indus. |
| | Setalux ® EPL-6870 film forming polymer | 643.00 | 643.00 | Akzo-Nobel, |
| | DI water | 19.50 | 45.50 | |
| | Solvent (ethylene glycol monobutyl ether) | 60.00 | 60.00 | Aldrich Chemicals |
| | Solvent (ethylene glycol monohexyl ether) | 25.00 | 25.00 | Union Carbide |
| | Neutralizing agent (amino methyl propanol (95%)) | 3.0 | 3.0 | Aldrich Chemical Company, Milwaukee, Wisconsin |
| | Nacure ® XP-221 catalyst with water (97/71) | 14.00 | 14.00 | King Industries, |
| | Perrindo maroon R-6438* | 20.00 | 20.00 | |
| Step 6 | Ingredients in Step 5 were stirred for 20 minutes and the following ingredient were added: | | | |
| | Water | 555.25 | 511.25 | |
| Step 7 | Ingredients in Step 6 were stirred for 20 minutes | | | |
| | final pH | 8.5 | 8.3 | |
| | final low shear viscosity (5 rpm) | 2200 | 2230 | Brookfield Rotary Viscosmeter |

*waterborne dispersion, DuPont manufacture, Bayer pigment, 20% pigment, 4.6% dispersant, dispersant as covered in U.S. Pat. No. 3,980,602

The following glamour results were obtained by analyzing a cured film of 30.5 micrometers (1.2 mil) thickness applied on a basecoated metal substrate of the foregoing coating compositions. Spray applied layers were pre-baked for 5 minutes at 82° C. (180° F.) followed by bake curing for 30 minutes at 129° C. (265° F.). Macbeth Analytical Computer/Analyzer was used to measure glamour:

| | | |
|---|---|---|
| Near specular L (HOB) | 92.41 | 86.53 |
| Flop/travel | 8.74 | 8.38 |

From the foregoing results, it is readily apparent that the presence of the phosphated segment copolymer of the present invention in a metallic coating composition improves its glamour over conventional coating compositions for pre-passivated aluminum flakes.

We claim:

1. An aqueous metallic flake containing coating composition comprising:

metallic flakes and a neutralized phosphated segmented copolymer dispersed in an aqueous carrier, said neutralized segmented copolymer comprising a neutralized phosphated graft copolymer, neutralized phosphated block copolymer or a combination thereof, wherein said graft copolymer comprises one or more nonionic hydrophilic segments attached at single terminal points to a hydrophobic segment, and said block copolymer comprises one or two of nonionic hydrophilic segments linearly attached to a hydrophobic segment, wherein a molar ratio of said hydrophobic segment to said nonionic hydrophilic segment in said graft and block copolymers varies in the range of from 96:4 to 4:96 and wherein said nonionic hydrophilic segment is polymerized from one or more nonionic monomers selected from the group consisting of ethylene oxide, propylene oxide, butylenes oxide, vinyl pyrolidone, oxazoline, and a combination thereof; and wherein said segmented phosphated copolymer is provided in the range of from 0.4 weight percent to 12 weight percent with phosphate moieties, all percentages being based on composition solids.

2. The coating composition of claim 1 wherein said hydrophilic segment has a GPC weight average molecular weight in the range of from 2,000 to 100,000.

3. The coating composition of claim 1 wherein said metal flake is aluminum.

4. The coating composition of claim 1 wherein said neutralized segmented copolymer is neutralized with a neutralizing agent selected from the group consisting of an inorganic base, an amine and a combination thereof.

5. The coating composition of claim 1 wherein said aqueous carrier comprises one or more solvents.

6. The coating composition of claim 5 wherein said solvent is selected from the group consisting of isopropanol, ethanol, methanol, butanol, 2-ethylhexanol, dodecanol, tetrahydrofuran, glycol ether, glycol ether acetate, toluene, hexane, butyl cellosolve, butyl cellosolve acetate, carbitol, propylene glycol monomethyl ether, ethylene glycol hexyl acetate, ethylene glycol n-butyl ether, dipropylene glycol, methyl ethyl ketone, acetone, methyl ether acetate and a combination thereof.

7. The coating composition of claim 5 wherein said solvent is a HAPs-free solvent selected from the group consisting of ethanol, butanol, butyl acetate, isobutanol, acetone, diacetone alcohol, methyl amyl alcohol, cyclohexanone, primary amyl acetate, methyl amyl ketone, 2-ethyl hexanol, propanol, ethyl acetate, tetrahydrofuran, isopropyl acetate, 2-ethyl hexyl acetate, ethyl 3-ethoxy propionate, pentyl propionate, ethanol, n-butyl propionate, tertiary butyl alcohol, 1-pentanol and a combination thereof.

8. The coating composition of claim 1 wherein when said metallic flakes are pre-passivated.

9. The coating composition of claim 1 wherein when the molar ratio is above 65:35 and a solubility parameter of said hydrophobic segment is below 8.9, said metallic flakes are pre-passivated, non-passivated or a combination thereof.

10. A coating on a substrate produced from the aqueous metallic flake containing coating composition of claim 1.

11. A method for producing aqueous metallic flake containing coating composition comprising:

preparing a segmented copolymer comprising a graft copolymer, block copolymer or a combination thereof, wherein said graft copolymer is prepared by:

polymerizing one or more ethylenically unsaturated monomers, one or more phosphate moiety reactive monomers and one or more nonionic macromonomers terminated with a polymerizable double bond to produce said graft copolymer having a hydrophobic segment with one or more nonionic hydrophilic segments attached at single terminal points thereto, said hydrophobic segment having one or more phosphate reactive moieties positioned thereon, said nonionic macromonomer being selected from the group consisting of polyethylene glycol monomethacrylate methyl ether, polypropylene glycol monomethacrylate methyl ether, polybutylene glycol monomethacrylate methyl ether, polyvinyl pyrolidone, polyoxazoline, and a combination thereof, and wherein a molar ratio of said hydrophobic segment to said nonionic hydrophilic segment in said graft copolymer varies in the range of from 96:4 to 4:96;

wherein said block copolymer is prepared by:

polymerizing one or more of nonionic monomers selected from the group consisting of ethylene oxide, propylene oxide, butylene oxide, vinyl pyrolidone, oxazoline and hydroxy ethyl (meth)acrylate, one or more phosphate moiety reactive monomers and one or more ethylenically unsaturated macromonomers to produce said block copolymer having a hydrophobic segment with one or two nonionic hydrophilic segments linearly attached thereto, said hydrophobic segment having one or more phosphate reactive moieties positioned thereon and wherein a molar ratio of said hydrophobic segment to said nonionic hydrophilic segment in said block copolymer varies in the range of from 96 4 to 4:96;

contacting orthophosphoric acid, phosphorus pentoxide, a phosphorus compound containing —O—PO(OH)$_2$ group, or a combination thereof with said segmented copolymer to provide said segmented copolymer with one or more said phosphate moieties thereon;

neutralizing said phosphate moieties on said segmented copolymer by contacting with a neutralizing agent to produce a neutralized phosphated segmented copolymer; and mixing metal flakes with said neutralized phosphated segmented copolymer in an aqueous carrier to produce said aqueous metallic flake containing coating composition.

12. The method of claim 11 wherein said polyhydroxyethyl methacrylate is a homopolymer.

13. The method of claim 11 wherein said polyhydroxy ethyl methacrylate is a copolymer polymerized from hydroxyethyl methacrylate and one or more methacrylic monomers.

14. The method of claim 11 wherein said nonionic macromonomer has a weight average molecular weight in the range of from 250 to 10,000.

15. The method of claim 11 wherein said metal flake is a pre-passivated aluminum flake.

16. The method of claim 11 wherein said aqueous carrier includes one or more HAPSs-free solvents.

17. The method of claim 11 wherein when the molar ratio is above 65:35 and a solubility parameter of said hydrophobic segment is below 8.9, said metallic flakes are pre-passivated, non-passivated or a combination thereof.

18. An aqueous metallic flake containing coating composition prepared by the method of claim 11.

19. A coating on a substrate produced from the aqueous metallic flake containing coating composition prepared by the method of claim 11.

* * * * *

UNITED STATES PATENT AND TRADEMARK OFFICE
CERTIFICATE OF CORRECTION

PATENT NO. : 6,646,070 B2
DATED : November 11, 2003
INVENTOR(S) : Berge Charles T. et al.

It is certified that error appears in the above-identified patent and that said Letters Patent is hereby corrected as shown below:

Column 18,
Line 5, "96 4" should be -- 96:4 --

Signed and Sealed this

Thirty-first Day of August, 2004

JON W. DUDAS
*Director of the United States Patent and Trademark Office*